J. A. SPEED.
CARBURETER.
APPLICATION FILED FEB. 23, 1911.
1,145,172. Patented July 6, 1915.
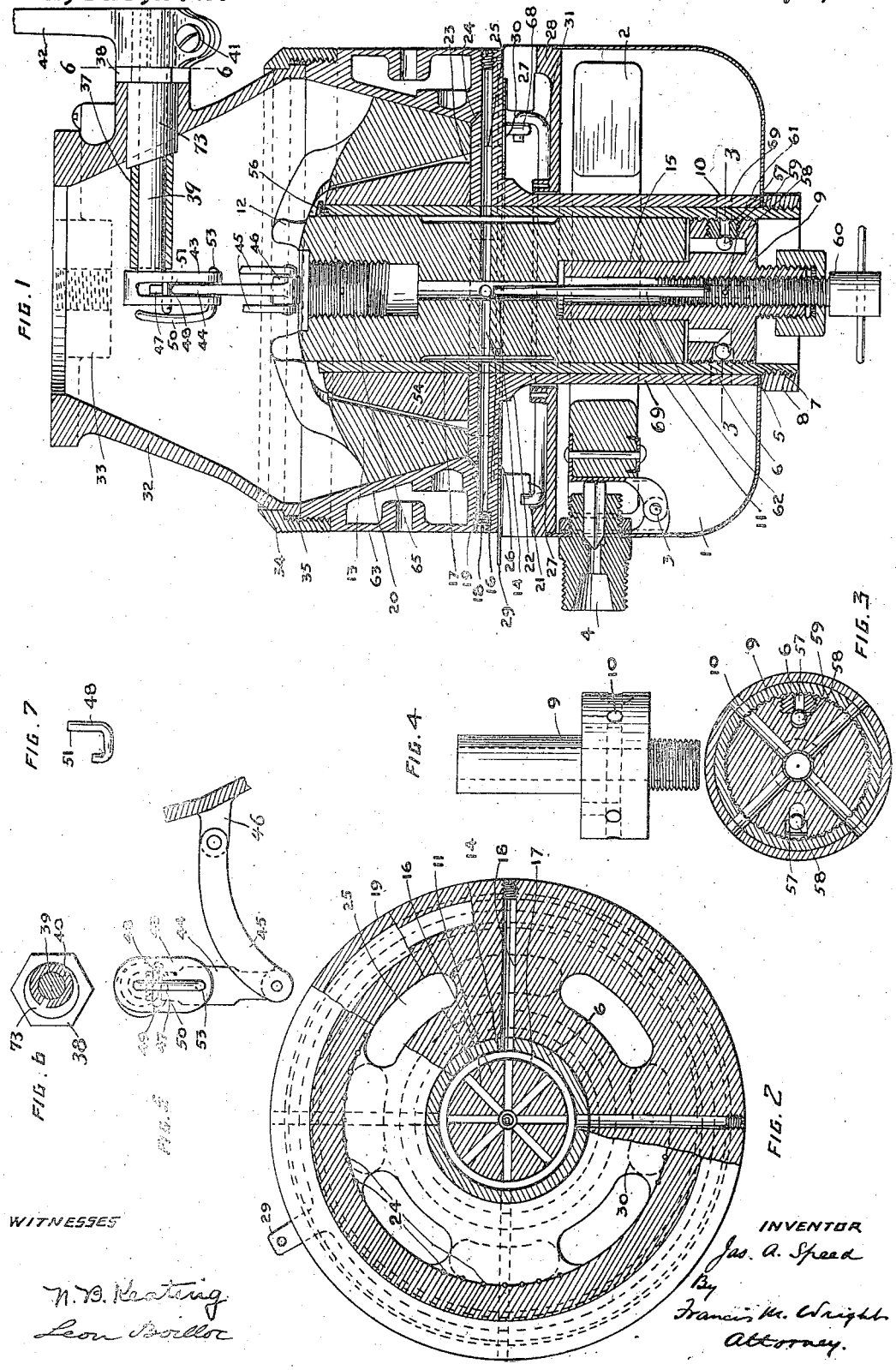

UNITED STATES PATENT OFFICE.

JAMES A. SPEED, OF SAN FRANCISCO, CALIFORNIA.

CARBURETER.

1,145,172. Specification of Letters Patent. Patented July 6, 1915.

Application filed February 23, 1911. Serial No. 610,343.

*To all whom it may concern:*

Be it known that I, JAMES A. SPEED, a citizen of the United States, residing at San Francisco, in the county of San Francisco and State of California, have invented new and useful Improvements in Carbureters, of which the following is a specification.

The present invention relates to improvements in carbureters, the object of the invention being to provide a carbureter, the operation of which will be automatic and will not be affected to any considerable extent by varying conditions of the atmosphere, the construction of which will be simple and without springs controlling the action of the main valve, which will obviate the danger of back-firing from the engine, in which the mixture supplied can be immediately made of the desired richness without affecting the operation of the carbureter, and in which it is not necessary to have any given float level.

In the accompanying drawing, Figure 1 is a vertical section of the carbureter; Fig. 2 is a section of Fig. 1 taken on two horizontal planes; Fig. 3 is a horizontal section on the line 3—3 of Fig. 1; Fig. 4 is a side view of the fluid fuel conduit detached; Fig. 5 is an end view of the valve stop, part of the cover being shown in section; Fig. 6 is a section on the line 6—6 of Fig. 1, an arm being removed; Fig. 7 is a detail view of the staple.

Referring to the drawing, 1 indicates a float chamber within which is contained a float 2 of light material, as cork, suitably pivoted, as shown at 3, to regulate the admission of fluid fuel into said float chamber through the fuel inlet 4, as in the usual construction so that about two-thirds of the float is immersed in the fuel. The bottom of said float chamber is centrally apertured, as shown at 5, to receive therein the bottom of the cylindrical dash pot 6, which is soldered and pinned within a sleeve 69, the lower end of which dash pot is threaded, as shown at 7, a nut 8 being screwed thereon, clamping the bottom of said float chamber against the bottom of said sleeve. Formed integral with said dash pot and located centrally therein and spaced from the inner wall of the dash pot is a fuel conduit 9, the interior of which communicates with a float chamber through holes 10 through the fuel conduit 9, dash pot 6 and sleeve 69, a suitable filtering screen 59 being provided around said holes. Fitting snugly in said dash pot is a plunger 11 the top of which is, by spider arms 12, integrally connected with a valve 13. Said plunger is formed with a central vertical conduit 14 extending from the bottom about one-half of the height of the plunger, the lower end of said conduit being enlarged, as shown at 15, to fit snugly around the fuel conduit 9. By the suction produced by the engine, the fuel passes upward in said fuel conduit 9 and then in the conduit 14 formed in the plunger, which constitutes an extension of said fuel conduit, and out from said plunger conduit through holes 16, extending laterally through the plunger, and into a circumferential groove 17 formed in the plunger. Said groove 17 registers with passages 18 extending through the wall of the dash pot and also through the base 19 of a carbureting chamber casing 20, the bottom of which is connected with the sleeve 69 by a contracted intermediate portion 22. The ends of said passages 18 communicate with a circumferential channel 23 formed in said casing 20, from which channel the fuel passes into the interior of said carbureting chamber by a large number of small passages 24 being drawn thereto by the suction of the engine. The air for combustion of said fuel is introduced into said carbureting chamber by a number, four being here shown, of apertures 25, in the base of said carbureting chamber. Said apertures may be closed, if desired, by a rotary shutter 26 which rotates on bearings formed on lugs 27, extending upward from a plate 28 supported upon the upper edge of the float chamber. The rotation of said shutter can be effected by means of an operative connection from any suitable point applied to an arm 29 formed on said shutter. Said shutter is formed with openings 30 corresponding in number and size with said apertures 25, so that said apertures can be normally left fully open. The air passing through the ports 21 between the lugs 27 and then through the openings 30 and 25″ is thus introduced to the fuel in the carbureting chamber. Said shutter is of great utility in starting the engine, as, by moving said shutter to so exclude the air, a richer mixture of combustible vapor is drawn into the engine, such richer mixture facilitating the starting. Also the shutter may be used with advantage on other occasions when it is desired to increase the richness of the mixture.

31 indicates a spring which rests upon the plate 28, one end of which is bent up and engages a lug 27 and the other end is bent up and passes through a hole in a depending portion 68 of the shutter. Said spring returns the shutter to its normal position when released, after it has been rotated by the operator.

32 indicates a cover which, in form, is substantially conical or upwardly convergent, and is provided at the top with lateral extensions 33 for securing it in the usual manner to the induction pipe, not shown. The lower circular edge of said cover fits upon the upper edge of the carbureting chamber casing, and said cover is secured thereto by the inwardly extending upper edge of a clamping ring 34 which is screwed on to an external thread 35 formed upon the carbureting chamber casing. Said cover is formed with a horizontal box through which is passed a cylindrical sleeve 73 having a bearing 37 extending eccentrically therefrom, and also formed at its outer end with a head 38 made hexagonal for conveniently turning the sleeve 73 in the box to adjust the bearing to any position desired and thus to regulate the extent of the minimum opening for the admission of explosive mixture to the induction pipe. Through said bearing extends a shaft 39. Upon the outer end of said shaft is secured a split brass sleeve 40, and around said sleeve is clamped by a screw 41 the split end of an arm 42, adapted to be connected with operative means leading from a distant point. The screw 41 through the split end of the arm permits the arm to be secured thereon at any position on the sleeve. The sleeve 40 forms a shoulder upon the shaft for preventing longitudinal movement thereof and likewise provides a larger bearing surface for the purpose of securing the arm against rotation on said shaft. To the inner end of said shaft 39 is rigidly secured a crank arm 43 formed of two parallel plates, between the ends of which is pivoted, by a pivot-pin 53, a link 44, the lower end of which is pivoted between the ends of two parallel arms 45 pivoted upon a lug 46 formed on the inner surface of the cover. Said link has an upward extension 47 past its pivotal union with the crank arm to provide means for arresting it in the lowest position, which means comprise also a staple 48 passed through holes 49 in said crank arm, which staple is normally retained in position by means of an upwardly bent extension 50 of the pivot pin 43, which pivotally connects the crank arm to the link. By turning said pivot pin so that said extension 50 is out of the way of said staple, said staple can be removed and its position changed. Said staple is formed with one arm 51 longer than the other, as shown in Fig. 7, so that, when said staple is removed and turned half way around and replaced in position, and also the extension 47 of the link is placed upon the other side of the crank arm, the movement of the link is on the opposite side of the shaft to that on which it was formerly. The object of providing this alternative arrangement is to enable the device to be used with either a link or other mechanism which is pushed toward the device, or with one that is pulled from it.

It will be observed that there is no direct connection between the lower end of the link and the valve 13, so that said link and the parts connected thereto do not constitute means for operating the valve, but only means for arresting the valve in its upward movement, and for determining the extent beyond which it cannot open. The valve operates automatically by the suction of the engine, the function of the link and the parts coöperating therewith being merely to provide means for limiting, when desired, and to any extent desired, the movement of said valve.

Around the dash pot is placed an auxiliary valve 54 which prevents danger from back firing and also serves other purposes. The outer surface of this valve is conical and fits snugly within the inner conical surface of the main valve 13 forming a seat for said main valve in the lower position of the latter. Before the engine is started both the main and auxiliary valves are in their lowest positions. In this lowest position on both valves there is an annular passage for the mixture between the two valves. The only object of constructing these valves, so that the annular conical space between them is not fully closed when they are both in their lowest positions is to furnish a vent through said passage for the gases, in case of back firing of the engine, and to permit said gases to escape through the air apertures 25 into the atmosphere and at the same time to entirely prevent the passage of said flames to the small fuel passages 24 in the base of the carbureting chamber which would ignite the fuel.

Immediately upon back pressure from the engine the main valve is forced to its seat, and on account of the annular passage between the main and auxiliary valves, even when open, being extremely narrow, and also of considerable length, no flame can pass through said annular passage on account of the cooling effect of the walls of said passage. Consequently no flames can escape backward and ignite any combustible vapor surrounding the carbureter.

The first effect upon starting of the engine is to raise the auxiliary valve 54, (which is comparatively light,) to close said annular passage, and then the suction of the engine also raises said main valve. The extent of movement of the auxiliary valve is very small, being limited by a screw 56 or other suitable means secured in the upper end of the dash pot. The main valve, however, can rise to a considerable distance above the auxiliary valve and the mixture then flows to the throttle by two passages, one around the circular edge of said main valve, and the other between the spider arms 12 thereof. The amount of the mixture drawn through the main valve is proportionate to the suction of the engine, unless limited by the stop as previously described. That is, if said stop be set at such a position as to allow the widest opening of the main valve, the valve will fall by gravity as the demand of the engine for mixture diminishes, but if the demand of the engine is increased a greater volume of mixture will be supplied.

Since the reciprocations of the piston of the engine are extremely rapid and air flows much more rapidly than liquid fuel, if the reciprocations of the valve were permitted to be as rapid as those of the piston, the result would be, unless proper provision were made, that, on account of the very rapid suction of air and fuel by the reciprocations of the valve, there would be too much air and too little liquid fuel in the mixture. To prevent this, I provide means for preventing the valve from rising with the same rapidity with which suction of the engine is applied thereto, and it is for this purpose that I provide a dash pot. This dash pot is furnished in the bottom with a plurality of passages 57 leading from the float chamber, of which passages I have here shown two, each of which is controlled by a check valve 58, so that when the valve is raised the liquid fuel can pass into said dash pot very slowly, but can pass out of said dash pot quickly. There is a tendency, therefore, when the valve 13 rises quickly, to produce a vacuum in the dash pot preventing the valve rising too rapidly. By this means, notwithstanding the rapid application of suction by the engine, the main valve is prevented rising very rapidly, and thus the suction produced by the valve is not applied so rapidly as to prevent the liquid fuel flowing into the carbureting chamber rapidly enough to be in proper proportion to the air also flowing therein. An advantage of this form of carbureter is that it does not require that the liquid fuel should be at a specific level as in many other carbureters now on the market although, of course, a float is needed for shutting off an excess of fuel. The liquid fuel as supplied to the motor is at a level of about an inch above that in the float in carbureters of medium sizes.

An important advantage arises from my improved carbureter in that I use a valve operated by gravity only, and without the use of springs. Since the resistance of the valve to the suction of the engine is merely that of its weight, this resistance remains constant. The variation in the supply of mixture is produced merely by varying the size of the passage through which the mixture flows, dependently upon the suction on the valve. In order to vary the size of the fuel passage according to the size of the engine, in the bottom of the fluid fuel conduit is screwed a sleeve 60, in which is pinned, as shown at 61, a tapering pin 62, which may be removed and replaceable by a pin of a different taper. A casing 63 surrounds the carbureting chamber to provide a water jacket to which hot water may be supplied to counteract the effect of the cold produced by the evaporation of the liquid fuel.

65 indicates a screw plug screwed into a central cavity in the valve, which can abut against the end of the link 45, and when worn can be replaced by a new plug.

I claim:—

1. In a carbureter, in combination with a main valve arranged to open automatically by suction from the engine, an auxiliary valve arranged to open automatically by back pressure from the engine, the carbureter having a fuel passage adapted to be closed by the main valve, and the main and auxiliary valves, when not under suction, being arranged to provide a vent passage for the escape of gases to the atmosphere in case of back-firing, substantially as described.

2. In a carbureter provided with a fluid carburant passage, main and auxiliary valves movable independently of one another and adapted to be raised by the suction from the engine to open said fluid fuel passage and spaced apart to provide a vent passage to permit gases passing through upon back firing of the engine, but too narrow to permit of flames passing therethrough, substantially as described.

3. In a carbureter provided with a fluid carburant passage, a main valve adapted to be raised by the suction from the engine to open said fluid carburant and air passage, and an auxiliary valve having a limited movement, said main and auxiliary valves being spaced apart when at rest to provide a vent passage for gases in case of back-firing of the engine, substantially as described.

4. In a carbureter provided with a fluid carburant passage, a main valve adapted to be raised by the suction from the engine to open said fluid carburant and air passage, to permit the flow of fuel vapor and air both on its inner and outer surfaces when raised from off its seat, and an auxiliary valve having a limited movement, said main and auxiliary valves being spaced apart when at rest to provide a vent passage for gases in case of backfiring of the engine, substantially as described.

5. In a carbureter provided with a fluid carburant passage, a valve controlling the flow of mixture from said passage, a movable stop for arresting the movement of said valve, a shaft for moving said stop, a bearing for said shaft, and means for variably supporting the shaft in said bearing, substantially as described.

6. In a carbureter provided with a fluid carburant passage, valve mechanism adapted to be operated by the suction from the engine to admit fluid carburant to the engine, and to be closed by the back pressure from the engine, said mechanism when closed by said back pressure being provided with venting means of sufficient size to permit the escape of the back firing gases while at the same time of such form and dimensions as to abstract heat from said gases when passing therethrough sufficient to reduce the temperature below that of ignition of gaseous fuel.

7. In a carbureter, a movable valve having its movement in an opening direction limited by adjustable means, a secondary valve associated therewith and forming with said valve a carbureting chamber, an inlet for fluid carburant under the control of said valve, an air inlet under the control of said valve, the secondary valve being operated by suction.

8. In a carbureter, a movable valve having its movement in an opening direction limited by adjustable means, a secondary valve concentric therewith and forming with said valve a carbureting chamber, an inlet for fluid carburant under the control of said valve, an air inlet under the control of said valve, independent means for adjusting the area of said inlet, the secondary valve being operated by suction.

9. In a carbureter, a movable valve having its movement in an opening direction limited by adjustable means, adjustable means, a secondary valve associated therewith, and forming with said valve a carbureting chamber, an inlet for fluid carburant under the control of said valve, an air inlet under the control of said valve, said valve arranged to open automatically by suction from the engine and in case of back-firing to close automatically and said member to open automatically a vent.

10. In a carbureter, a movable valve having its movement in an opening direction limited by adjustable means, adjustable means, a secondary valve associated therewith, and forming with said valve a carbureting chamber, an inlet for fluid carburant under the control of said valve, an air inlet under the control of said valve, said valve arranged to open automatically by suction from the engine and in case of back-firing to close automatically and said member to open automatically a vent.

In testimony whereof I have hereunto set my hand in the presence of two subscribing witnesses.

JAMES A. SPEED.

Witnesses:
FRANCIS M. WRIGHT,
D. B. RICHARDS.